United States Patent
Chen et al.

(10) Patent No.: US 7,194,899 B1
(45) Date of Patent: Mar. 27, 2007

(54) METHOD OF ESTIMATING CRACK ANGLES AND ROTATION SPEEDS OF ENGINE

(76) Inventors: Bo-Chiuan Chen, 4F., No. 11, Lane 47, Jinlong Rd., Taipei City (TW); Yuh-Yih Wu, 2F., No. 170-5, Songde Rd., Taipei City (TW); Feng-Chi Hsieh, No.228, Changsha St., Taitung City (TW)

( * ) Notice: Subject to any disclaimer, the term of this patent is extended or adjusted under 35 U.S.C. 154(b) by 0 days.

(21) Appl. No.: 11/420,805

(22) Filed: May 29, 2006

(51) Int. Cl.
*G01M 15/00* (2006.01)
(52) U.S. Cl. .................................... 73/117.3
(58) Field of Classification Search ................ 73/116, 73/117.2, 117.3, 118.1; 701/29, 101, 110, 701/111; 340/439, 441
See application file for complete search history.

(56) References Cited

U.S. PATENT DOCUMENTS

| | | | | |
|---|---|---|---|---|
| 5,452,604 A | * | 9/1995 | Namiki et al. | 73/116 |
| 5,771,482 A | * | 6/1998 | Rizzoni | 701/101 |
| 5,808,186 A | * | 9/1998 | Matsumoto et al. | 73/117.3 |
| 6,041,647 A | * | 3/2000 | Matsuoka | 73/116 |
| 7,013,719 B2 | * | 3/2006 | Adachi et al. | 73/117.3 |
| 7,069,774 B2 | * | 7/2006 | Nakamura et al. | 73/117.3 |
| 2004/0182142 A1 | * | 9/2004 | Nakamura et al. | 73/118.1 |

FOREIGN PATENT DOCUMENTS

TW 1243904 11/2005

* cited by examiner

*Primary Examiner*—Eric S. McCall (57) ABSTRACT

A method for estimating crank angles and rotation speeds of an engine, having a signal processing unit to generate a dynamic sampling signal based on the tooth number signal of the crank detected by a crank angle sensor, an estimation unit designed by a discrete kinematic model and containing an estimator and a feedback gain matrix to read the dynamic sampling signal, and a crank rotation stroke discriminator allowing the signal processing unit to calculate a more precise crank dynamic sampling signal, so as to preclude external noises to interfering control of the engine.

11 Claims, 6 Drawing Sheets

METHOD OF ESTIMATING CRACK ANGLES AND ROTATION SPEEDS OF ENGINE

BACKGROUND

The present invention relates in general to a method of estimating crank angles and rotation speeds of an engine, and more particularly, to a method of processing a measured crank signal by a time based methodology and obtaining a feedback gain matrix by using pole placement method, solving Riccati formula, solving infinite time domain of Riccatic, so as to perform an estimation of crank angles and rotation speeds in a close-loop state. The present invention further relates to a method of discriminating a crank stroke for assisting the calculation of crank dynamic sampling signal.

The typical internal combustion machine (engine) is equipped with an engine control unit (ECU) to read the signals of crank angle, rotation speed and acceleration. The signal of the crank angle provides information of ignition timing control and fueling timing control, while the signals of crank rotation speed and acceleration can be used to estimate the engine indicative torque and engine failure diagnostics. The engine control unit detects the crank angle sensor mounted on a flywheel that synchronously rotating with the crank to detect the signal of crank rotation. However, as the signals detected by the sensor are easily interfered by external noises, the calculation result is unreliable.

The commonly used processing and calculation techniques for the crank signals include position-based method and time-based method. The position-based method requires a larger tooth number of the flywheel (such as 180 or 360 teeth) to obtain a precise crank angle position. Therefore, a massive processing capability of the engine control unit is demanded to avoid interrupt or insufficient memory space occurring during calculation. This method is thus more costly and more difficult to implement.

The time-based method requires relative smaller tooth number of the flywheel (such as 1, 4, 24 or 32 teeth) for calculating the crank angle of the engine. Therefore, this method provides a more economic approach for dynamically estimation of crank rotation. However, this method is susceptible to noises introduced to the crank signals such that error estimation often occurs.

To prevent the noise from interfering the crank signals, currently, a low pass filter (LPF) has been used to filter the noise of the crank angle sensor. When the calculated crank signal traveling through the low pass filter is greater than a default value, the low pass filter will output a voltage signal. The low pass filter creates a delay effect and when the noise is exceedingly larger, the noise is often output as the actual signal.

In the published Taiwanese Patent No. 1243904, The Applicant of the current application has disclosed a method which uses a Kalman filter to estimate crank angle and rotation speed. The method integrates an estimation formula and a Kalman filter of a measuring matrix into a rotation dynamic estimation system of an engine. In addition, the crank angle θ measured by an electric signal processing system, an engine torque estimation value $\hat{T}_{br}$ obtained from an engine torque estimation system, and a load torque estimation value $\hat{T}_{load}$ obtained from a load torque estimation system are used to estimate the crank angle and rotation speed, such that when the crank position sensor is interfered by noise, the influence on engine control can be reduced. This method requires the parameter of rotation inertia of the engine and viscosity coefficient. Any errors of these parameters will affect the estimation precision of the filter and the system robustness.

With regard to the calculation method of sublimes allocation and solving Riccati to obtain the feedback gain matrix and to discriminate the crank rotation stroke, although such arithmetic techniques have been disclosed, they have never been associated or applied in the close-loop estimation of engine crank angle and rotation speed or assisting process of crank dynamic sampling signals.

BRIEF SUMMARY

By performing close-loop estimation and correction on a crank position estimated by a time-based method, relatively precise estimations of crank angle and rotation speed can be obtained, particularly with the existence of external noises which interferes the crank signal detected by a sensor. Without the need of pressure signal at the gas input manifold and the engine parameters, the crank angle and rotation speed can be estimated to effectively suppress the interference source caused by external noise. In addition, the load upon the equipment for signal processing is reduced to lower the equipment cost. The method can be applied to various types of engines.

To perform the estimation described above, a device including a signal process unit and an estimation unit comprised of an estimator and a feedback gain matrix are provided. The signal process unit is operative to read the tooth information of the crank detected by the sensor, the time difference between the readings of the tooth information since the engine is activated and the counter starts to operate, and to calculate the crank rotation speed $\omega_k$ and acceleration $\alpha_k$. After the counter is zeroed and the calculation is restarted, the dynamic crank sampling angle $\omega_k$ and the crank acceleration $\alpha_k$ can be obtained; and consequently, the dynamic sampling crank rotation angle $\theta_m$, rotation speed $\omega_m$, and acceleration $\alpha_k$ can be obtained.

The estimation unit is designed based on a discrete kinematic model and includes an estimator and a feedback gain matrix to perform estimation under a close-loop condition, so as to filter noise interference and to estimate the crank angle and rotation speed. The feedback gain matrix can be formed by the following steps.

Firstly, the pole placement method and the factor comparison method to obtain the system dynamics of the estimator. By comparing the feedback gain matrices obtained by the pole placement method and the comparison factor rule, a feedback matrix required by the estimator is obtained.

In the second step, a transient solution for solving the Riccati formula, which incorporates an update law of an estimation auto-convariance, is used to obtain a real-time update feedback gain matrix $L_k$, so as to obtain the adaptive feedback gain matrix required by the estimator.

Thirdly, the Riccati formula is used and the infinite time horizon thereof is solved to obtain a feedback gain matrix value required by the estimator.

In addition, a stroke discriminator unit is used to read the crank tooth information of the crank angle sensor and the crank rotation speed $\omega_m$ obtained by the process unit to inspect the top dead center (TDC) position of the crank, so as to record the crank rotation speed $\omega_{TDC}(i)$. The current crank rotation speed $\omega_{TDC}(i)$ is then compared to the previous crank rotation speed $\omega_{TDC}(i-1)$ to provide the dynamic zero signal to the signal process unit when the crank angle is calculated up to 720°. Thereby, the precision of the calculation of the signal process unit is enhanced.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
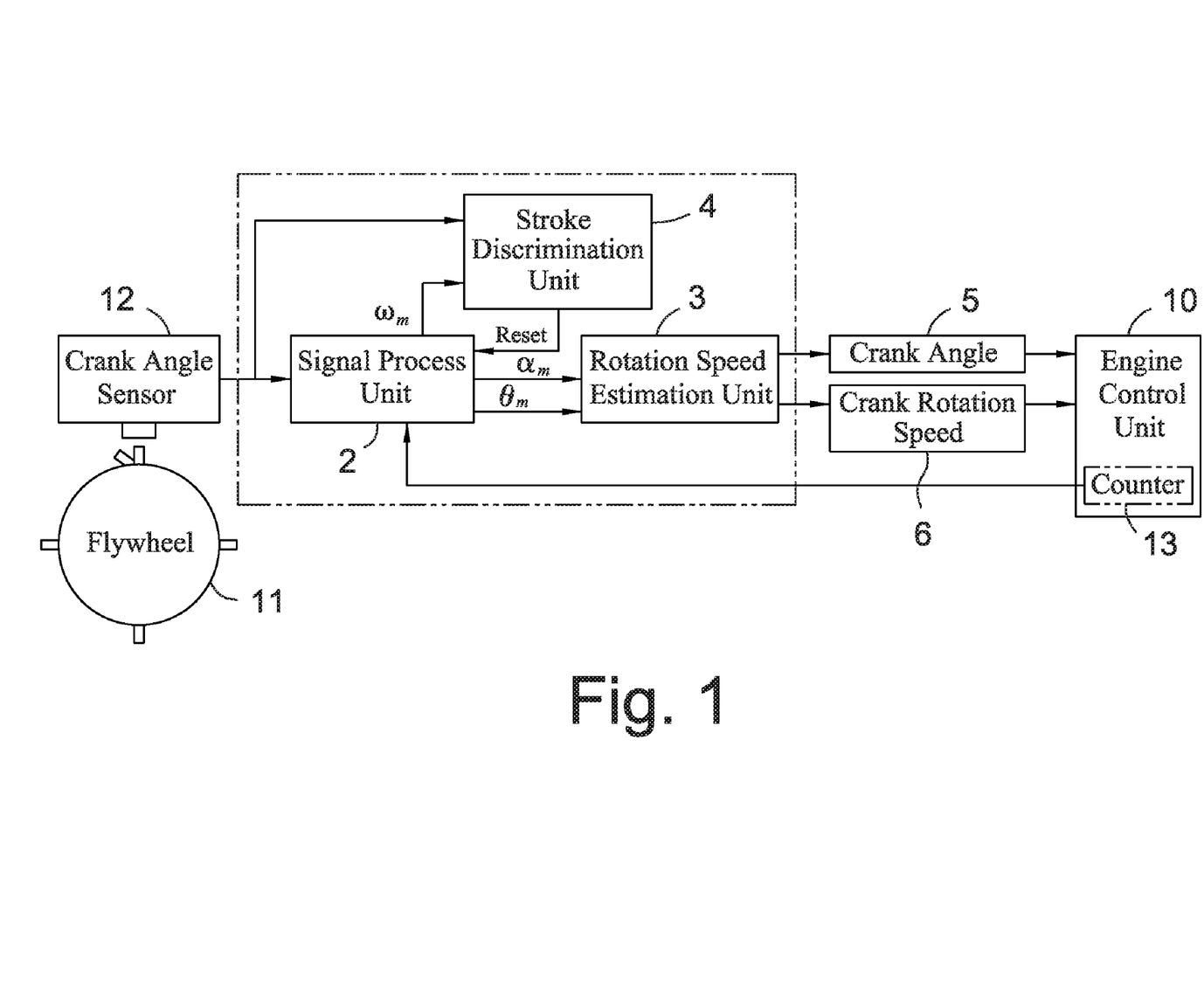
FIG. 1 is a allocation flow chart of an estimation structure.

As shown in FIG. 1, the estimation structure of engine crank angle and rotation speed includes a signal process unit 2 and a crank angle and rotation speed estimation unit 3 for estimating the crank angle 5 and rotation speed 6. The estimation structure may also include a stroke identification unit to assist the signal process unit 2 to process the crank signal more precisely.

The above estimation structure includes allocating an engine control unit 10 on a fly wheel 11 that has a crank angle sensor 12 to detect crank tooth signal and a counter 13 or on the peripheral of the flywheel 11, so as to execute estimation of the crank angle 5 and crank speed 6. The method includes the following steps.

Figure 2:
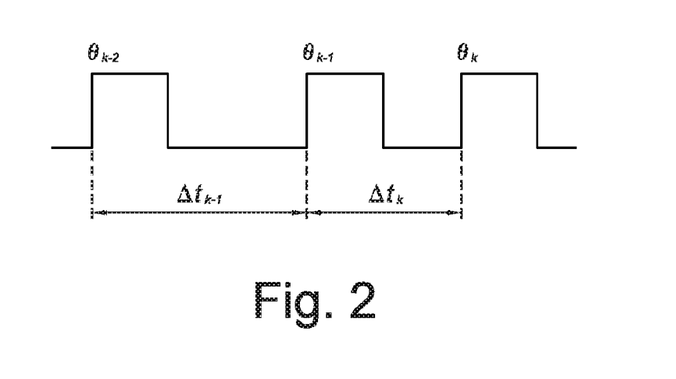
FIG. 2 is a calculation process chart of a signal process unit.

A signal process unit 2 is used to read the crank tooth signals in step 21 (as shown in FIG. 2) detected by the crank angle sensor 12 on the flywheel 10 and the counter 13 starts counting since the engine is operating in step 20. In step 22, the rising edges of the tooth signals for the crank angle $\theta_k$, $\theta_{k-1}$, and the time difference $\Delta t_k$, $\Delta t_{k-1}$ between the crank angle $\theta_k$ and $\theta_{k-1}$ are recorded. The crank rotation speed $\omega_k$ and acceleration $\omega_k$ can be calculated by the following equations:

$$\omega_k = \frac{\theta_k - \theta_{k-1}}{\Delta t_k} \tag{1}$$

$$\alpha_k = \frac{\omega_k - \omega_{k-1}}{\Delta t_k - \Delta t_{k-1}} \tag{2}$$

where $\omega_k$ is the crank rotation speed for the kth tooth signal, $\theta_k$ is the crank angle for the kth tooth signal, $\theta_{k-1}$ is the crank angle of the (k−1)th tooth signal, $\Delta t_k$ is the time difference between the (k−1)th tooth signal and the kth tooth signal, $\Delta t_{k-1}$ is the time difference between the (k−2) tooth signal and the (k−1)th tooth signal, $\alpha_k$ is the crank acceleration of the kth tooth signal, and $\omega_{k-1}$ is the crank rotation speed of the (k−1)th tooth signal.

Figure 3:
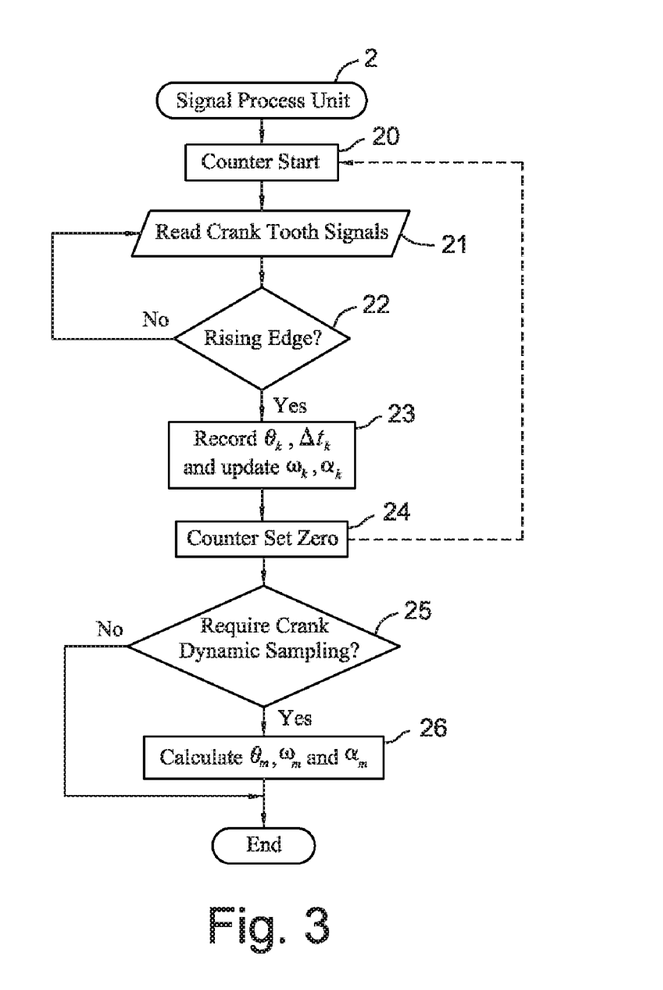
FIG. 3 is a schematic drawing of the sampling of crank signals.

At the rising edge of each tooth signal (step 22 as shown in FIGS. 2 and 3), each tooth signal represents a crank angle $\theta_k$ or $\theta_{k-1}$ assuming that there are n teeth. When the crank angle θ is triggered at the rising edge of the kth tooth signal, the process unit 2 is operative to record the time difference $\Delta t_k$, and the counter zeros to start the time counting so as to perform calculation based on Equations (1) and (2) and to update the records of the records of the crank rotation speed and acceleration obtained in step 23.

After the counter zeros at step 24, the signal process unit 2 is operative to provide the crank dynamic sampling requirements for other units at step 25. In other words, assuming that the acceleration is constant, the signal process unit 2 is operative to calculate the dynamic sampling crank angles $\theta_m$, rotation speed $\omega_m$, and acceleration $\alpha_m$ at step 26 by the Equations (3), (4) and (5) as:

$$\theta_m = \theta_k + \omega_k \Delta t + \frac{\alpha_k \Delta t^2}{2} \tag{3}$$

$$\omega_m = \omega_k + \alpha_k \Delta t \tag{4}$$

$$\alpha_m = \alpha_k \tag{5}$$

where Δt is the time difference required for the kth sampling tooth signal.

A discrete kinematic model is used to design an estimation unit 3 for filtering the interference caused by noise and to estimate the crank angle and rotation speed. The discrete kinematic model can be presented by the following status formula (6) as:

$$x_{k+1} = F x_k + G u_k + F w_k \tag{6}$$

where $$F = \begin{bmatrix} 1 & T \\ 0 & 1 \end{bmatrix},$$

$$x_k = [\theta_k \ \omega_k]^T,$$

$$G = \begin{bmatrix} T^2/2 \\ T \end{bmatrix},$$

T is the measurement system sampling time, $u_k = \alpha_m$, T=G is the disturbance matrix external to the measurement system, and $\omega_k$ is the desturbance by external noise. The output vector can be presented by the Equation (7) as:

$$y_k = H x_k + v_k \tag{7}$$

where H=[1 0] according to $\theta_m$ and $v_k$ is the sensor noise.

The above estimation unit 3 is operative to receive the crank sampling angle $\theta_m$ and acceleration $\alpha_m$ calculated by the signal process unit 2 to estimate the crank angle and rotation speed. When the crank angle sensor is interfered by noise, the effect upon the engine control is minimized. The estimation 3 includes an estimator and a feedback gain matrix to perform close-loop estimation. The estimator is actually a measurement system $\hat{x}_{k+1}$, and both the estimator and the feedback gain matrix can be presented by Equation (8) as:

$$\hat{x}_{k+1} = F\hat{x}_k + Gu_k + L(y_k - H\hat{x}_k) \tag{8}$$

where $\hat{x}_k=[\hat{\theta}_k\ \hat{\omega}_k]$ is the measurement system status of the estimator, $L=[L_1\ L_2]^2$ is the feedback gain matrix.

Before designing the above estimation unit 3, whether the measurement system is a measurable system has to be confirmed. When the rank of measurement matrix $\Omega$ is full rank, the measurement system is a measurable system, and the measurement matrix $\Omega$ can be presented as:

$$\Omega = \begin{bmatrix} H \\ HF \end{bmatrix} = \begin{bmatrix} 1 & 0 \\ 1 & T \end{bmatrix} \quad (9)$$

From Equation (9), $$\text{Rank}(\Omega)=2 \quad (10),$$

such that the measurement system is a measurable system.

There are three ways of designing the feedback gain matrix L as discussed above. The first method includes a pole placement method which obtains the ideal measurement system dynamic formula (Equation (11)) according to the selected natural frequency $\omega$ and damping ratio $\zeta$ of the measurement system as:

$$z^2-\alpha_1 z+\alpha_2=0 \quad (11),$$

where $z$ is the discrete time status, $\alpha_1=2e^{-\zeta\omega_n T}(e^{j\omega_n T\sqrt{1-\zeta^2}}+e^{-j\omega_n T\sqrt{1-\zeta^2}})$, $\alpha_2=e^{-2\zeta\omega_n T}$, $\omega_n$ is the natural frequency parameter, $\zeta$ is the damping ratio parameter, and T is the measurement system sampling time.

The factor comparison method is used to assign the poles of the estimator at the poles determined by the designer to obtain the measurement system dynamic which can be presented by:

$$z^2+(L_1-2)z+TL_2+1-L_1=0 \quad (12)$$

where $L_1$ and $L_2$ are the L values of the feedback gain matrix.

By the comparing Equations (11) and (12), the value of the feedback gain matrix L can be obtained as:

$$L = \begin{bmatrix} L_1 \\ L_2 \end{bmatrix} = \begin{bmatrix} 2-2e^{-\zeta\omega_n T} \\ \dfrac{1-2e^{-\zeta\omega_n T}+e^{-2\zeta\omega_n T}}{T} \end{bmatrix}. \quad (13)$$

In the second method, the transient solution of Riccati formula is solved to obtain a real-time update feedback gain matrix $L_k$, where the Riccati formula is presented as:

$$M_{k-1}=F[M_k-M_k HR^{-1}H^T M_k]F^T+\Gamma Q\Gamma^T \quad (14),$$

where $$F = \begin{bmatrix} 1 & T \\ 0 & 1 \end{bmatrix},$$

$M_k$ is the update law for the estimated auto covariance $P_k$, $H=[1\ 0]$, R is the noise variance of the sensor, Q is the variance of the system interference, and R and Q are adjustable parameters.

The estimated auto covariance $P_k$ can be presented as:

$$P_k=(M_k^{-1}+H^T RH)^{-1} \quad (15),$$

where $M_k$ is the update law of the estimated auto covariance $P_k$.

By the above Riccati Equation (14) associated with the estimated auto covariance formula (Equation (15)), the adaptive feedback gain matrix $L_k$ can be obtained as:

$$L_k=P_k H^T R^T \quad (16).$$

In the third method, the Riccati formula is used to solve an infinite time domain. That is, the parameter k in Equation (14) is set infinitely large, such that:

$$M_\infty=F[M_\infty-M_\infty HR^{-1}H^T M_\infty]F^T+\Gamma Q\Gamma^T \quad (17)$$

From Equation (17), the required feedback gain matrix $L_\infty$ can be obtained by:

$$L_\infty=M_\infty H^T(HM_\infty H^T+R)^{-1} \quad (18).$$

Figure 4:
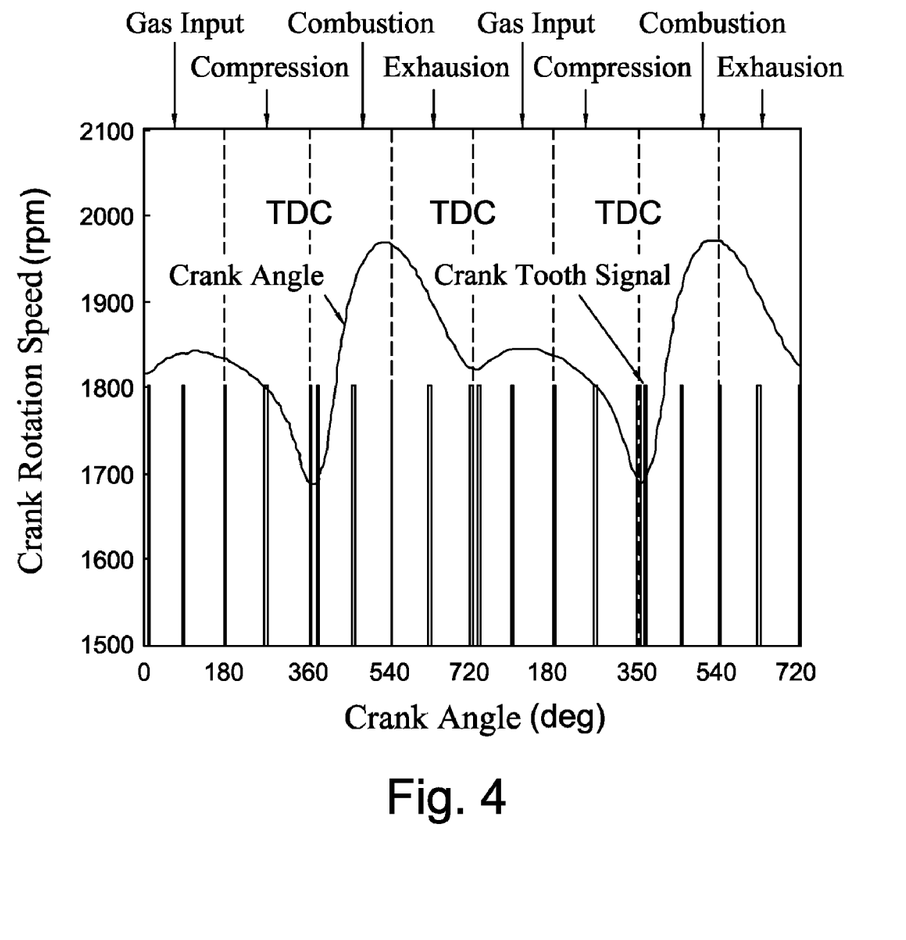
FIG. 4 shows the waveform of the dynamic varied crank rotation speed for various tooth signals.

In addition to the process unit 2 operative to read the crank tooth information from the crank angle sensor 12, a stroke discrimination unit 4 (as shown in FIG. 1) can also be used to read the crank tooth signal and the dynamic crank sampling acceleration $\omega_m$ of the signal process unit 2, and to perform the stroke discrimination of the engine according to the transient dynamic variation of the crank (FIG. 4). Particularly, by using a specific tooth signal such as that for the more or less than one tooth, the top dead center of the crank can be obtained. The overall process flow of the stroke discrimination unit 4 includes the following steps.

Figure 5:
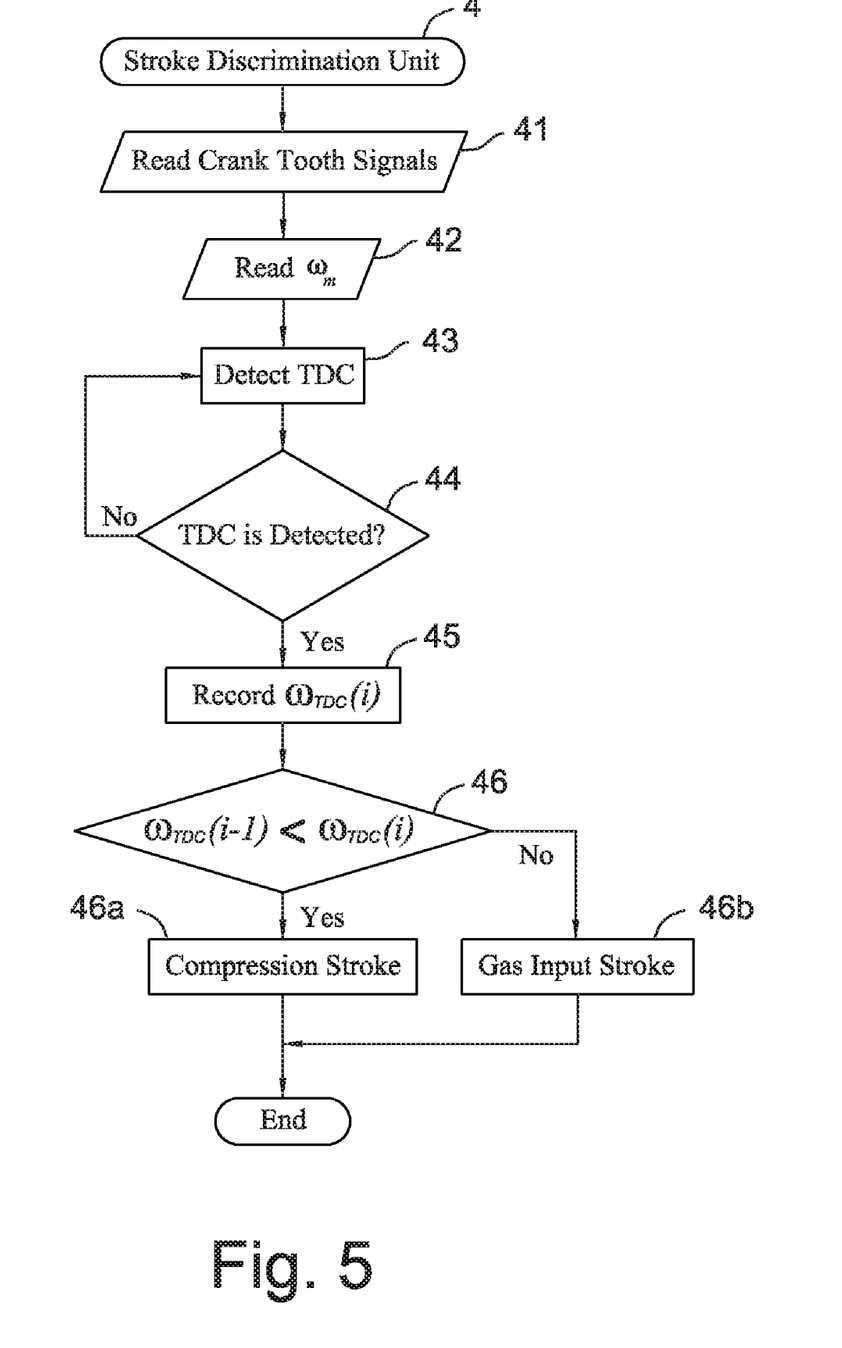
FIG. 5 shows the process flow of the stroke discrimination unit.

The crank tooth signal detected by the crank angle sensor is read in step 41, and the crank rotation speed $\omega_m$ calculated by the process unit 2 is read in step 42. As denoted in step 43, the location of the top dead center is continuously detected. When the location of the previous top dead center (TDC) is detected in step 44, the crank rotation speed $\omega_{TDC(i-1)}$ of the previous top dead center is immediately recorded in step 45. If the crank rotation speed $\omega_{TDC(i)}$ of the current top dead center is smaller than that of the previous top dead center, a compression stroke top dead center is determined in step 46a. Otherwise, a gas input stroke top dead center is determined in step 46b. The gas input stroke or compression top dead center as detected is operative to provide a dynamic zero signal to the process unit 2 for calculating the crank angle up to 720°. Thereby, a more accurate calculation of the dynamic sampling crank angle and acceleration can be obtained, so as to enhance the precision of crank angle $\theta_m$ and rotation speed $\alpha_m$ estimated by the estimation unit 3.

In the above method, the stroke discrimination unit 4 is only optional. When the stroke discrimination unit 4 is not adapted, the process unit 2 is limited to provide the sampling angle $\theta_m$ and acceleration $\alpha_m$ of the crank rotation up to 360° to the estimation unit 3. However, the precision is still much more enhanced compared to the conventional method and design.

To prove the applicability the method and design proposed above, a crank angle sensor 12 is used to directly measure a flywheel 11 with 4+1 teeth (as shown in FIG. 1) and noise is added to the crank signal to describe and compare the results of the estimated crank angle and rotation speed to those directly measured from the conventional sensor.

In the method of designing feedback gain matrix L, the natural frequency parameter of the measurement system can be set as $\omega_m=5(\text{rad/s})$, the damping ratio parameter can be set as ζ=0.707, the variation parameter of system interference in the second and third methods for designing the feedback gain matrix L can be set as Q=10, and the sensor noise variation parameter can be set as R=10⁻⁶.

Figure 6:
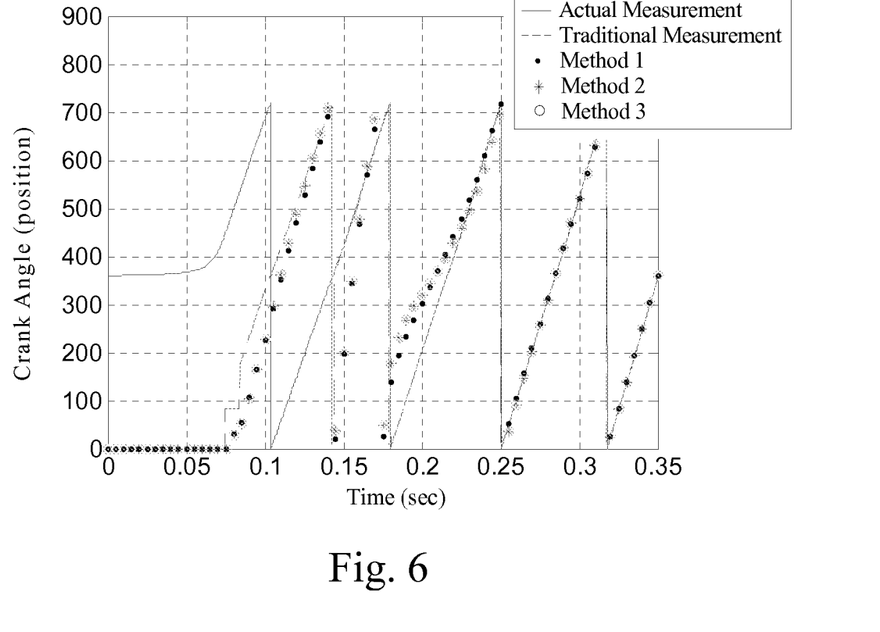
FIG. 6 shows the waveform of the estimated crank angle before introducing noise.
Figure 7:
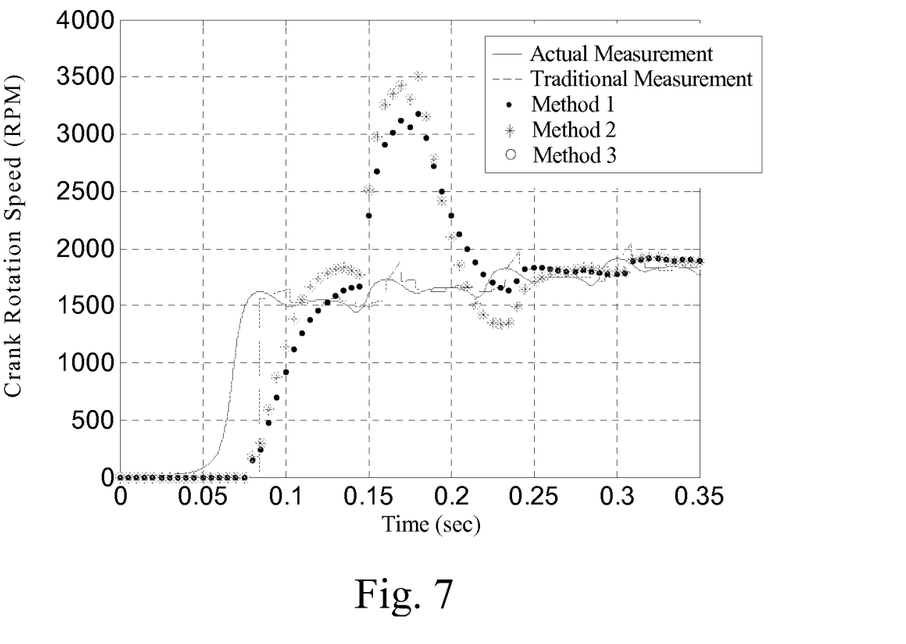
FIG. 7 shows the waveform of the estimated crank rotation speed before introducing noise.

The simulation upon the engine cold start are performed (as shown in FIGS. 6 and 7). In FIG. 6, the actually measured crank angle is not at the zero position at the beginning of the stroke. By the error of the initial stroke value, the changes between the traditional measurement method and the methods as provided above can be observed. In other words, in the first 720° operation cycle of the crank, initial stroke values obtained by the conventional measurement and the three methods are not correct. However, at the beginning of the second 720° operation cycle, the correct stroke can be gradually discriminated. As the methods proposed here is to use the time-based method to estimate the crank position and to perform close-loop estimation correction, the convergence of the position estimation is slower than the conventional method. Meanwhile, the estimation of the crank rotation speed will also be dynamically affected (as shown in FIG. 7). However, after the third 720° operation cycle, the crank angle and rotation speed are both converged. As the conventional method uses Equation (1) to directly calculate the crank rotation speed, it will not be affected by the calculation of the position.

Figure 8:
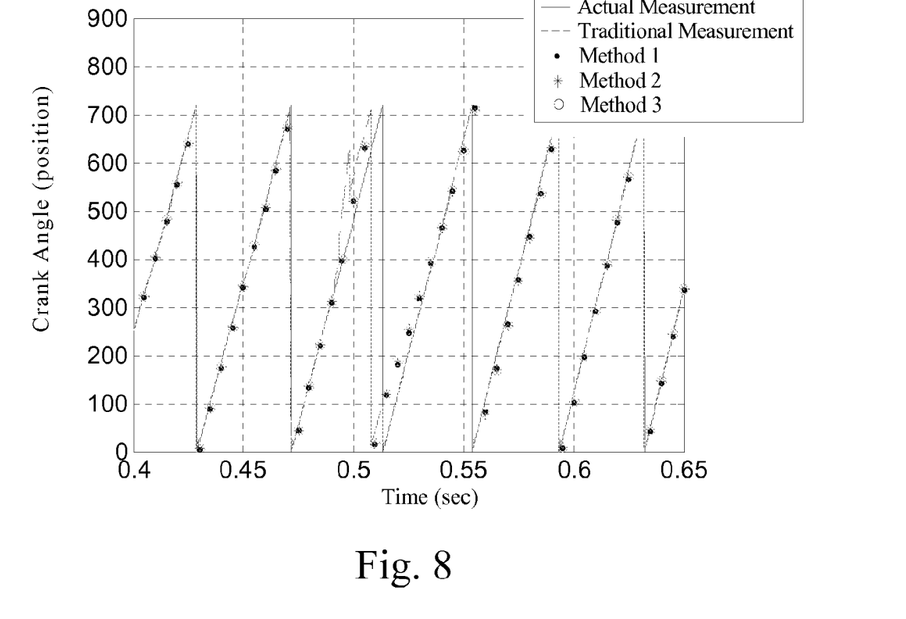
FIG. 8 shows the waveform of the estimated crank angle after introducing noise.
Figure 9:
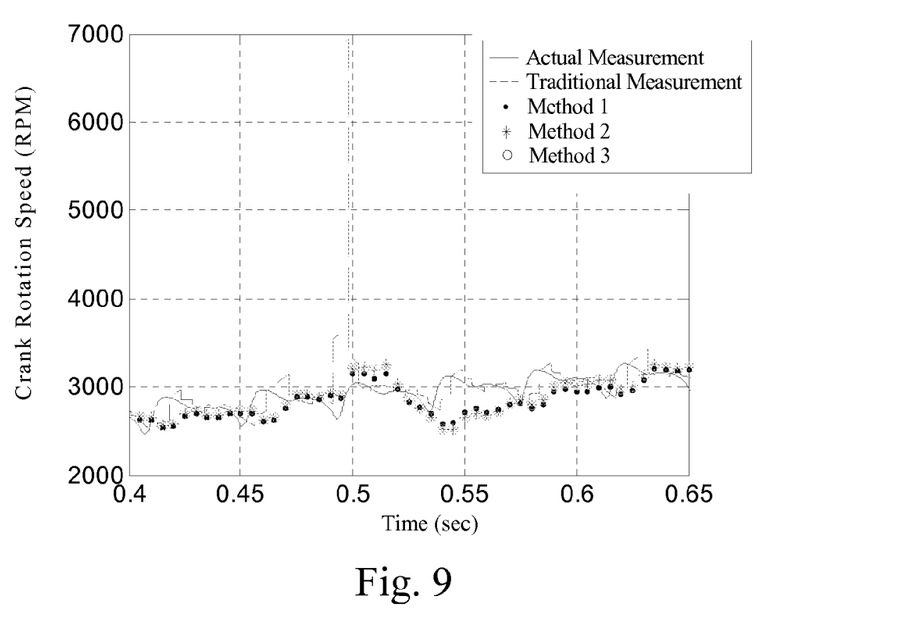
FIG. 9 shows the waveform of the estimated crank rotation speed after introducing noise.

When the noise is imposed to the crank angle sensor at 0.48 seconds, the influence on the estimation of the crank angle and rotation is shown in FIGS. 8 and 9. In FIG. 8, the estimation of the crank angle is illustrated. As shown, when a strong noise is introduced to the crank signal, errors occur to estimation result in the conventional measurement method. In contrast, the introduction of noise provides much less influence upon the estimated rotation compared to the conventional method. For example, when the noise causes 4000 rpm of the rotation speed estimated by the conventional method, only an error of 500 rpm is created by the proposed methods.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of estimating engine crank angle and rotation speed, comprising:
   detecting a plurality of successive tooth signals, wherein each tooth signal provides a crank angle $\theta_k$ for one of a series of teeth of the engine;
   calculating a crank rotation speed $\omega_k$ and a crank acceleration $\alpha_k$ based on the tooth signals and time difference $\Delta t_k$ between the tooth signals;
   calculating a sampling crank k angle $\theta_m$ by updating the detected crank angle $\theta_k$ based on the time difference $\Delta t_k$, the calculated rotation speed $\omega_k$ and the calculated acceleration $\alpha_k$;
   calculating a sampling crank rotation speed $\omega_m$ by updating the calculated crank rotation speed $\omega_k$ based on the time difference $\Delta t_k$ and the calculated acceleration $\alpha_k$;
   defining the calculated acceleration as a sampling acceleration $\alpha_m = \alpha_k$; and
   designing an estimation unit based on a discrete kinematic model, the estimation unit includes an estimator and a feedback gain matrix to perform a close-loop estimation.

2. The method of claim 1, wherein:
$$\omega_k = \frac{\theta_k - \theta_{k-1}}{\Delta t_k}; \text{ and } \alpha_k = \frac{\omega_k - \omega_{k-1}}{\Delta t_k - \Delta t_{k-1}}.$$

3. The method of claim 2, wherein:
$$\theta_m = \theta_k + \omega_k \Delta t + \frac{\alpha_k \Delta t^2}{2};$$
and
$$\omega_m = \omega_k + \Delta t \alpha_k.$$

4. The method of claim 3, further comprising:
a) presenting the estimation unit by a status formula as:
$$x_{k+1} = Fx_k + Gu_k + \Gamma w_k,$$
where
$$F = \begin{bmatrix} 1 & T \\ 0 & 1 \end{bmatrix},$$
$$x_k = [\theta_k \; \omega_k]^T,$$
$$G = \begin{bmatrix} T^2/2 \\ T \end{bmatrix},$$

T is the measurement system sampling time, $u_k = \alpha_m$, $\Gamma = G$ is the interference matrix external to the measurement system, and $\omega_k$ is the interference by external noise;
b) providing an output vector by:
$$y_k = Hx_k + v_k,$$
where H=[1 0] according to $\theta_m$ and $v_k$ is the measurement error of the sensor; and
c) presenting the estimator by a measurement system:
$$\hat{x}_{k+1} = F\hat{x}_k + Gu_k + L(y_k - H\hat{x}_k),$$
where $\hat{x}_k [\hat{\theta}_k \; \hat{\omega}_k]$ is the measurement system status of the estimator, $L=[L_1 \; L_2]^2$ is the feedback gain matrix.

5. The method of claim 4, wherein the measurement system has a full-rank measurement matrix presented as:
$$\Omega = \begin{bmatrix} H \\ HF \end{bmatrix} = \begin{bmatrix} 1 & 0 \\ 1 & T \end{bmatrix},$$
and
when Rank ($\Omega$)=2, the measurement system is a measurable system.

6. The method of claim 4, wherein the feedback gain matrix L is designed by:
a pole placement to measure a system natural frequency $\omega_n$ and a damping ratio $\zeta$ and to provide a dynamic formula of an ideal measurement system as:
$$z^2 - \alpha_1 z + \alpha_2 = 0,$$

where z is the discrete time status, $\alpha_1=2e^{-\zeta\omega_n T}(e^{j\omega_n T})$, $\alpha_2=e^{-2\zeta\omega_n T}$, $\omega_n$ is the natural frequency parameter, $\zeta$ is the damping ratio parameter, and T is the measurement system sampling time;

a factor comparison method to assign a pole of the estimator at a pole location, so as to obtain a measurement system dynamic as:

$$z^2+(l_1-2)z+TL_2+1-L_1=0,$$

where $L_1$ and $L_2$ are the L values of the feedback gain matrix; and comparing the dynamic formula and the measurement system dynamic to obtain a value of the feedback gain matrix as:

$$L = \begin{bmatrix} L_1 \\ L_2 \end{bmatrix} = \begin{bmatrix} 2 - 2e^{-\zeta\omega_n T} \\ \dfrac{1 - 2e^{-\zeta\omega_n T} + e^{-2\zeta\omega_n T}}{T} \end{bmatrix}.$$

7. The method of claim 4, the feedback gain matrix is designed by resolving a transient solution of Riccati formula to obtain a real-time update feedback gain matrix $L_k$ as:

$$M_{k+1}=F[M_k-M_k HR^{-1}H^T M_k]F^T+\Gamma Q\Gamma^T,$$

where $M_k$ is the update law for the error covariance $P_k$ which is:

$$P_k=(M_k^{-1}+H^T RH)^{-1}; \text{ and}$$

presenting the adaptive feedback gain matrix $L_k$ as:

$$L_k=P_k H^T R^T.$$

8. The method of claim 7, wherein the parameter k of the Riccati is set as infinitely large, such that:

$$M_\infty=F[M_\infty-M_\infty HR^{-1}H^T M_\infty]F^T+\Gamma Q\Gamma^T; \text{ and}$$

the corresponding feedback gain matrix is:

$$L_\infty=M_\infty H^T(HM_\infty H^T+R)^{-1}.$$

9. The method of claim 1, further comprising:
providing a stroke discrimination unit to performing:
reading the tooth signals and the calculated crank rotation $\omega_k$;
detecting a top dead center on the crank and recording the crank rotation speed at the top dead center $\omega_{TDC(i)}$;
comparing the crank rotation speed at two consecutive top dead center ($\omega_{TDC(i)}$ and $\omega_{TDC(i-1)}$);
obtaining dead centers of a compression stroke and a gas input stroke; and
providing a dynamic zero signal of the crank angle calculated up to 720°.

10. The method of claim 9, further comprising determining the dead center of the compression stroke when the current crank speed $\omega_{TDC(i)}$ is smaller than the previous crank speed $\omega_{TDC(i-1)}$.

11. The method of claim 10, further comprising a step of determining the dead center of the gas input stroke when the current crank speed $\omega_{TDC(i)}$ is larger than the previous crank speed $\omega_{TDC(i-1)}$.

* * * * *